United States Patent Office 3,185,655
Patented May 25, 1965

3,185,655
COLORED POLYMER
Howard B. Dersnah, Thomas C. Schlotter, Jr., and Wayne
C. Beach, Midland, Mich., assignors to The Dow
Chemical Company, Midland, Mich., a corporation of
Delaware
No Drawing. Filed May 18, 1960, Ser. No. 29,787
7 Claims. (Cl. 260—23)

The invention relates to a colored low melting castable polymer composition and more particularly relates to a colored low melting castable polymer composition having substantially the optical properties and colorability of general purpose polystyrene.

Heretofore suppliers of pigmented or colored polystyrene have found color matching of their product with a sample of painted metal, wood or plastic, or with a cloth or paper swatch, ceramic tile, plastic article or other colored object, a tedious and uncertain task. In most cases the colored object to be matched is colored with dyes and pigments which are not compatible with a polystyrene blend while the object itself possesses optical and physical characteristics quite different from those exhibited by polystyrene. Thus a perfect color match in which brilliance, hue, depth, etc. are indistinguishable is seldom feasible, if not outright impossible. Under such conditions the acceptability of a color match is subject to the aesthetic feelings of the viewer. The net result is that much time and polystyrene have been irretrievably consumed heretofore in selecting pigments or other color imparting substances for production lots of colored polystyrene.

It is therefore an object of the invention to provide a means of overcoming many of the difficulties previously encountered in color matching general purpose polystyrene to colored objects.

Another object of the invention is to provide a colored low melting castable polymer composition which exhibits substantially the same optical properties as colored polystyrene, and is compatible with color concentrates that are usable in polystyrene compositions.

Another object of the invention is to provide a colored low melting castable polymer composition which exhibits substantially the same optical properties as colored polystyrene, and is compatible with color concentrates that are usable in polystyrene compositions.

Another object of the invention is to provide a colored low melting castable polymer composition which does not yellow or darken or yield an unpleasant odor on being melted and cast.

A further object of the invention is to provide a colored low melting castable polymer composition which does not stratify into laminar form during solidification on being cast into a color chip or wafer.

Still another object of the invention is to provide a method of casting colored low melting polymer composition having substantially the same colorability as polystyrene.

These and other objects and advantages of the invention are attained by the colored low melting castable polymer composition and the method of casting the same hereinafter more fully described.

For the purposes of the specification and claims a colored polymer composition is one containing pigments and/or dyes and includes compositions containing white or black pigments.

The composition of the invention is prepared from one or more color concentrates and a low melting polymeric material.

The selection of the polymeric material is critical as most such materials are unsatisfactory because the melting point is either too high, or the material discolors on being melted, or on being molten and cast the material is brittle or tacky.

Suitable materials, hereinafter more fully described, are (1) a copolymer of vinyl toluene and coconut oil, (2) poly (alpha-methylstyrene), (3) a low melting polystyrene, (4) a low melting polyethylene or (5) a mixture of a low melting polystyrene, and poly (alpha-methylstyrene).

The desired copolymer of vinyl toluene and coconut oil is prepared by slowly adding, at a temperature of about 392° F. and under total reflux, a mixture consisting of 135 parts of vinyl toluene monomer and 1.35 parts of ditertiary butyl peroxide catalyst to 10 parts of a commercial refined grade of coconut oil while the reacting mixture is continuously stirred. The addition is made over a period of about five hours and heating is continued for an additional hour at which time polymerization is satisfactorily complete. A suitable reaction mixture of vinyl toluene and coconut oil will contain between 7 and 10 percent of the oil.

A specific poly (alpha-methylstyrene) usable in the composition of the invention is transparent and water white. It shatters easily, having an impact strength well below 0.1 foot-pound per square inch. It has a molecular weight average in the range of 600 to 1000, a softening temperature of about 215° F., and is pourable for casting at 300° F. Other poly (alpha-methylstyrene) materials that are suitable have a molecular weight average between 600 and 1000 with substantially no cross-linking.

The low melting polystyrene which is usable by itself as the polymeric material is water white and has an impact strength below about 0.1 foot-pound per square inch. It has an average molecular weight of about 17,500, and as a 10 percent by weight solution in toluene it exhibits a viscosity of 2 centipoises. It softens at a temperature of about 300° F. and is liquid enough to be pourable for casting at a temperature of 350° F.

A usable polyethylene is Epolene C, a trademarked product which is slightly cloudy, has a waxy feel, a penetration hardness of 0.7 mm. under a 100 gram load for 5 seconds at 77° F. Epolene C has an average molecular weight of about 7000 and is pourable at about 300° F., having a Brookfield viscosity of 7300 centipoises at 320° F.

The mixtures of poly (alpha-methylstyrene) and low melting polystyrene may be prepared by milling together the above described poly (alpha-methylstyrene) and up to 35 percent by weight of a transparent water white polystyrene having an average molecular weight of about 140,000. The polystyrene appropriate for the mixture may further be defined as having an impact strength slightly less than 0.1 foot-pound per square inch, a softening temperature of 300° F., a solution viscosity of 9 centipoises and a melt viscosity in the range of 500 to 1000 centipoises. In a more preferred manner of preparing the mixture the two components are mixed in monochlorobenzene medium and the solvent is subsequently removed from the mixture. The most suitable proportions are 15 to 35 percent by weight of the low melting polystyrene, the balance being the said poly (alpha-methylstyrene).

The foregoing polymeric substances are low melting (i.e., below 365° F.,), yet they exhibit the general texture of, and have optical properties similar to, that of general purpose polystyrene. The described poly (alpha-methylstyrene) is preferred for its colorability but the low melting polystyrene-poly (alpha-methylstyrene) mixtures are even more preferred because the color chips cast therefrom have a higher impact strength and are more durable.

General purpose polystyrene is generally considered to be a transparent water-white polymer having an average molecular weight of about 300,000. It softens at about 375° F. and discolors on being heated to temperatures at which it is readily poured. It has a melt viscosity of 200 to 400 centipoises, and a solution viscosity of 30 centipoises.

A suitable color concentrate consists of a dispersion in a liquid vehicle of one or more pigments or dyes hereinafter referred to as a color imparting substance, selected from those commonly employed in coloring general purpose polystyrene. The vehicle must blend readily with the selected low melting polymeric substance when the latter is molten but must not cause the cast polymer to laminate (i.e., solidify in discrete layers), during solidification nor become over-plasticized whereby the cast piece is rendered tacky. Suitable vehicles are dioctylphthalate, and dioctylphthalate, containing up to 20 weight percent of petrolatum.

A suitable dispersant may be advantageously used to disperse a pigment or dye in the vehicle employed in making up a color concentrate. The dispersant also promotes uniformity of mixing of the color imparting substance with molten polymeric material.

While most commonly recognized dispersants appear to produce neither beneficial nor deleterious effects, two which are especially efficacious are Sotex NC, a trademarked product consisting essentially of long chain fatty (aliphatic) acid esters containing multiple ether linkages, and Dowfax 6A2, a trademarked product consisting essentially of the sodium salt of a halogenated, alkylated sulfonated diphenyl oxide. Up to 2 percent of one of these is advantageously added to the vehicle in making up the color concentrate.

In carrying out a color matching procedure using the composition and method of the invention, a colored object to be matched is first examined for the character of its color. This is conveniently and accurately done by determining its reflectance spectrum using a standard spectrophotometric instrument which is equipped for reflectance measurements, though a highly capable and experienced technician may achieve generally rapid color matches without the assistance of a spectrophotometer. Thereafter by combining the spectral data with visual observation an appropriate selection may be made of the color imparting substances which should be used to obtain a close color match.

About 100 grams, or more, of polymeric material is then melted as by heating in a Pyrex glass beaker on a hot plate, care being taken to avoid overheating, and predetermined amounts of the color selected are added to the molten polymer in the form of color concentrates, conveniently from respective graduated hypodermic syringes, and blended as by stirring. Heating the composition to temperatures above about 450° F. is generally to be avoided.

The color imparting substances selected for coloring the composition are customarily employed in the form of dispersions or solutions known as color concentrates. It is usually best to employ the predominant color imparting substance in high concentration to avoid having to add too much vehicle to the composition. It is also desirable to employ a dilute dispersion of any color imparting substance which is to be used in small amount whereby more subtle color control is possible.

In compounding a composition containing the polyvinyl toluene-coconut oil or the low molecular weight polystyrene as the polymeric substance it is best not to employ more than about 15 percent by weight of the color concentrate to avoid overplasticizing the polymeric material with the vehicle. On the other hand when poly (alpha-methylstyrene) is used as the polymeric substance up to 20 percent by weight of color concentrate may be employed if desired.

As soon as the color concentrate is well blended the composition is ready to be cast in a preheated shallow open mold. The fluidity of the composition should be such that air bubbles are entrapped neither by stirring nor by pouring the composition into the mold, as a bubble-free color chip is more easily and validly compared to a colored object.

About 15 grams of the composition is cast. This usually is enough to produce a color chip of adequate size for making color comparisons. Water cooling the mold after casting the molten composition speeds up the solidification of the composition.

The finished color chip is lifted or otherwise removed from the mold as soon as it is entirely solidified and a color comparison is made. Color modifications of the polymer composition to suit the aesthetic feelings of a viewer are completed by making appropriate small additions of color concentrate to the remainder of the molten composition described above. The volume of each such addition is readily determined by noting the position of the plunger in each syringe before and after the addition. A new color chip is then cast and compared and further color modification of the remaining molten composition carried out if desired.

On achieving a satisfactory color match the requisite proportions of polymer and color concentrate are readily computed since the respective amounts of each employed in color matching are known.

A highly satisfactory color match is thus quickly and economically achieved using the present novel composition and method of casting, and the results are immediately translatable into production formulas for colored polystyrene such as general purpose polystyrene.

*Example*

As an example of the preparation and use of the composition of the invention a blue comparison standard was color matched as follows:

Spectrophotometric and visual examination of the comparison standard showed that the use of a mixture of selected pigments (a white, a blue, a green and a black) could be expected to result in a good match. A color concentrate of each selected pigment was made up in a vehicle consisting of 20 percent by weight, petrolatum, the balance dioctylphthalate. The concentrations of the pigments in percent by weight were: the white, 20 percent; the blue, 10 percent; the green, 10 percent; and the black, 0.1 percent.

100 grams of a polyvinyl toluene-coconut oil copolymerization reaction product, prepared as described hereinabove, was melted and brought to a temperature of about 350° F. whereby it was pourable. Then 6.25 cubic centimeters (cc.) of the white concentrate, 0.70 cc. of the blue concentrate, 0.84 cc. of the green concentrate, and 1.00 cc. of the black concentrate were added to the melted polymer and thoroughly stirred in. A color chip was cast by pouring about 15 grams of the so-prepared compositions into a shallow open mold. The composition quickly cooled and solidified. The cast chip was lifted from the mold and compared to the comparison standard. Thereupon 1.1 cc. of the white concentrate was added to the remaining molten composition and blended. A new color chip was cast. Comparison of the solidified color chip indicated the need for further modification: 0.03 cc. of the green concentrate was added to the remaining melted composition and blended and a new chip was cast. Then addition of 0.08 cc. of the green concentrate to the remaining melted composition completed the match as the subsequently cast color chip matched the comparison standard to the satisfaction of the viewer.

Obvious modifications of the present composition are to be considered within the scope of the invention, for example, the inclusion of glass or cellulose fiber fillers to obtain a better match in the case of a finished product which will contain such fillers.

Among the advantages of the composition of the invention are (1) the freedom from lamination when cast according to the method of the invention, (2) the freedom from bad odor in the product, (3) the avoidance of the necessity of extruding the composition, as is the case with higher melting general purpose polystyrene and (4) the attendant savings since a considerably smaller quantity of polymeric material suffices.

We claim:
1. A colored low melting castable polymer composition comprising (A) a polymeric substance selected from the group consisting of (1) the copolymerization reaction product of a mixture consisting essentially of 7 to 10 percent by weight coconut oil, the balance vinyl toluene monomer, (2) poly (alpha-methylstyrene) having an average molecular weight in the range of 600 to 1000, and a softening temperature of about 215° F., (3) a low melting polystyrene having an average molecular weight of about 17,500 and a softening temperature of about 300° F., (4) a polyethylene having an average molecular weight of about 7000 and sufficient fluidity to be pourable at temperatures above about 300° F., and (5) a mixture consisting of up to 35 percent by weight of a polystyrene having an average molecular weight of about 140,000 a softening temperature of about 300° F., and a melt viscosity of 500 to 1000 centipoises, the balance the said poly (alpha-methylstyrene), and (B) a color concentrate consisting essentially of a color imparting substance dispersed in a vehicle selected from the group consisting of (1) dioctylphthalate and (2) a mixture consisting of up to 20 percent by weight petrolatum, the balance dioctylphthalate.

2. The composition as in claim 1 wherein said vehicle contains up to 2 percent of a dispersant selected from a long chain fatty acid ester containing multiple ether linkages, and the sodium salt of a halogenated, alkylated sulfonated diphenyl oxide.

3. A colored castable polymer composition melting below about 365° F. comprising (A) a polymeric substance selected from the group consisting of (1) the copolymerization product of a mixture consisting essentially of 7 to 10 percent by weight coconut oil, the balance vinyl toluene monomer, (2) poly (alpha-methylstyrene) having an average molecular weight in the range of 600 to 1000, and a softening temperature of about 215° F., (3) a low melting polystyrene having an average molecular weight of about 17,500 and a softening temperature of about 300° F., (4) a polyethylene having an average molecular weight of about 7000 and sufficient fluidity to be pourable at temperatures above about 300° F., and (5) a mixture consisting of up to 35 percent by weight of a polystyrene having an average molecular weight of about 140,000, a softening temperature of about 300° F., and a melt viscosity of 500 to 1000 centipoises, the balance the said poly (alpha-methylstyrene) and (B) up to 20 percent by weight of a color concentrate consisting of a color imparting substance dispersed in a vehicle selected from the group consisting of (1) dioctylphthalate and (2) a mixture consisting of up to 20 percent by weight petrolatum, the balance dioctylphthalate.

4. A colored castable polymer composition melting below about 365° F. comprising (A) a mixture consisting of about 15 to 35 percent by weight of a polystyrene having an average molecular weight of about 140,000, a softening temperature of about 300° F., and a melting viscosity of 500 to 1000 centipoises, the balance a poly (alpha-methylstyrene) having an average molecular weight in the range of 600 to 1000, and a softening temperature of about 215° F., and (B) up to 20 percent by weight of a color concentrate consisting essentially of at least one color imparting substance dispersed in a vehicle selected from the group consisting of (1) diocylphthalate, and (2) a mixture consisting of about 20 percent by weight petrolatum, the balance dioctylphthalate.

5. The composition as in claim 4 wherein the vehicle contains up to 2 percent of a dispersant selected from a long chain fatty acid ester containing multiple ether linkages, and the sodium salt of a halogenated, alkylated sulfonated diphenyl oxide.

6. A colored castable polymer composition melting below about 365° F. comprising (A) a poly (alpha-methylstyrene) having an average molecular weight in the range of 600 to 1000 and a softening temperature of about 215° F., and (B) up to 20 percent by weight of a color concentrate consisting essentially of at least one color imparting substance dispersed in a vehicle, said vehicle being selected from the group consisting of (1) dioctylphthalate, and (2) a mixture consisting of about 20 percent by weight petrolatum, the balance dioctylphthalate.

7. A method of casting a colored low melting polymer composition which comprises heating a polymeric substance selected from the group consisting of (1) the copolymerization reaction product of a mixture consisting essentially of 7 to 10 percent by weight coconut oil, the balance vinyl toluene monomer, (2) poly (alpha-methylstyrene) having an average molecular weight in the range of 600 to 1000, and a softening temperature of about 215° F., (3) a low melting polystyrene having an average molecular weight of about 17,500 and a softening temperature of about 300° F., (4) a polyethylene having an average molecular weight of about 700 and sufficient fluidity to be pourable at temperatures above about 300° F., and (5) a mixture consisting of up to 35 percent by weight of a polystyrene having an average molecular weight of about 140,000, a softening temperature of about 300° F., and a melt viscosity of 500 to 1000 centipoises, whereby said polymeric substance melts; blending with the so-molten polymeric substance a predetermined amount of at least one color concentrate whereby a molten colored composition is formed, each said color concentrate consisting essentially of at least one color imparting substance dispersed in a vehicle selected from the group consisting of (1) dioctylphthalate, and (2) a mixture consisting of about 20 percent by weight of petrolatum, the balance dioctylphthalate; and casting said molten colored composition in a mold whereby a color chip is formed.

References Cited by the Examiner
UNITED STATES PATENTS 2,718,513 9/55 Beardsell _____ 260—27
2,807,609 9/57 Danuser et al. _____ 260—37

LEON J. BERCOVITZ, Primary Examiner.

A. D. SULLIVAN, Examiner.